United States Patent [19]
Grossman

[11] Patent Number: 5,307,450
[45] Date of Patent: Apr. 26, 1994

[54] Z-SUBDIVISION FOR IMPROVED TEXTURE MAPPING

[75] Inventor: Mark S. Grossman, Mountain View, Calif.

[73] Assignee: Silicon Graphics, Inc., Mountain View, Calif.

[21] Appl. No.: 128,063

[22] Filed: Sep. 28, 1993

Related U.S. Application Data

[63] Continuation of Ser. No. 657,325, Feb. 19, 1991, abandoned.

[51] Int. Cl.$^5$ .............................................. G06F 15/72
[52] U.S. Cl. .................................... 395/123; 395/130
[58] Field of Search ............... 395/121, 123, 128, 130, 395/134, 125

[56] References Cited

U.S. PATENT DOCUMENTS

| | | | |
|---|---|---|---|
| 3,816,726 | 6/1974 | Sutherland | 395/134 X |
| 4,930,092 | 5/1990 | Reilly | 395/123 |
| 4,974,176 | 11/1990 | Buchner et al. | 395/128 |
| 5,113,490 | 5/1992 | Winget | 395/134 X |

OTHER PUBLICATIONS

—Heckbert, Paul S., "Survey of Texture Mapping", Graphics Interface '86/Vision Interface '86, pp. 207-212 (1986).
—Williams, Lance, "Pyramidal Parametrics", Computer Graphics, vol. 17, No. 3, pp. 1-11, (Jul. 1983).

Primary Examiner—Mark K. Zimmerman
Attorney, Agent, or Firm—Blakely, Sokoloff, Taylor & Zafman

[57] ABSTRACT

A graphical display system and a method for Z-subdivision of polygons into quadrilaterals and triangles whose vertices are arranged between two adjacent Z planes. This slicing allows both atmospheric and texture parameters to be interpolated linearly with minimal error within each quadrilateral or triangle slice. Object data from a host computer is processed by four pipelined graphics subsystems before being displayed on a display screen. Each object is decomposed into a set of primitives. Each primitive may intersect one or more Z planes thereby producing a set of component portions of the primitive. Once a primitive is sliced into component portions, a texture is mapped onto each component portion by interpolating texture parameters to points on or within the component portion. Finally, the textured component portions are rendered on a display device thereby creating a seamless complete object.

22 Claims, 9 Drawing Sheets

Z-SUBDIVISION FOR IMPROVED TEXTURE MAPPING

This is a continuation of application Ser. No. 07/657,325 filed Feb. 19, 1991, now abandoned.

FIELD OF THE INVENTION

The present invention relates to the display of images on a computer display screen. Specifically, the present invention relates to the computer generation and display of multi-dimensional images.

BACKGROUND OF THE INVENTION

Computer graphics systems are commonly used for displaying graphical objects on a display screen. These graphical objects include points, lines, polygons, and three dimensional solid objects. Using techniques well known in the art, color and surface details can be added to areas and surfaces of objects. One particularly useful technique for adding surface detail to areas or surfaces is texture mapping. Using texture mapping, a pattern image or texture map is combined with an area or surface of an object thereby producing a modified object with the added detail of the texture map. For example, given a flat black solid cube and a texture map defining a wood grain pattern, the texture mapping technique can be used to map the wood grain pattern onto the cube thereby producing a cube that appears to be made of wood. The texture mapping technique is particularly useful as surface detail becomes finer and more intricate thereby rendering the use of geometric primitives less practical.

The effect of texture mapping onto objects can be further improved using filters. Filters are useful for blurring or uniformly reducing the detail of a texture mapped onto an object. Filtering used in this way is particularly useful for modeling the distance that an object is located from the viewer, the effects of atmospheric fog, or the effect of poor lighting. For example, one would expect that an object positioned close to the viewer would appear to have greater detail that an object located some distance away from the viewer. This effect can be created in a computer graphics environment by applying a filter to the more distant object. One limitation in the use of filters in the prior art is the fact that filters typically must be applied uniformly for each of the pixels in an area or surface of an object. This limitation on the use of filters is particularly troublesome for generating and displaying objects where more than one filter level is necessary. For example, a polygon may be generated depicting a road extending into the distance. As expected for a perspective view, the sides of the road would be positioned wide apart in the foreground and converging to a point in the distance. Texture mapping may be used to apply an asphalt surface to the road object. A viewer would expect, however, to see finer detail of the road texture in the foreground versus the road texture in the distance. In order to appropriately model this perspective view, a fine detail filter should be used in the foreground of the road object, and a coarse detail filter should be used in the more distant region of the road object. Further realism may be achieved by using a plurality of filters at intermediate points of the road object from the nearest point to the furthest point. Typically, however, prior art systems have been unable to apply more than one filter to a single area or surface.

One way used in the prior art for applying variations in the detail of a texture mapped onto an object is to apply a filter to each pixel of an area or surface of the object. In this way, complete control over the rendering of an object can be achieved. Unfortunately, however, the use of a separate filtering computation for each pixel is very computationally expensive. Use of the pixel filtering technique requires extremely fast and typically expensive hardware. In some situations for large and complex objects, the use of the pixel filtering technique may not be possible for generating the object within the allowable time constraints. Thus, a better technique is needed for applying variant filter levels to a graphical object.

It is therefore an object of the present invention to provide a technique for applying various filter levels to areas and surfaces of a single object. If is further an object of the present invention to provide a means for applying various filter levels to areas and surfaces of an object without requiring an expensive filter computation on a per pixel basis. It is a further object of the present invention to provide a means and method for applying atmospheric and texture parameter variations to an object based on its distance from the eye of a viewer.

SUMMARY OF THE INVENTION

The present invention provides a means and a method for slicing polygons into quadrilaterals and triangles whose vertices are arranged between two adjacent Z planes. This slicing allows both atmospheric and texture parameters to be interpolated linearly with minimal error within each quadrilateral or triangle slice.

Object data from a host computer is processed by four pipelined graphics subsystems before being displayed on a display screen. These graphics subsystems include: 1) a Geometry Subsystem, 2) a Scan Conversion Subsystem, 3) a Raster Subsystem, and 4) a Display Subsystem. The Geometry Subsystem receives graphical data from the host computer and converts it to screen-space data. The Scan Conversion Subsystem then breaks down points, lines, polygons, and meshes thereby producing pixel data. This pixel data is sent to the Raster Subsystem where a Z-buffer removes hidden surfaces. The Raster Subsystem also performs various blending and texturing functions on a pixel-by-pixel basis as the pixels are written to image bit-planes, or a frame buffer. Finally, the Display Subsystem reads the frame buffer and displays the image on a color monitor.

Interactive texture mapping is achieved on the graphics hardware of the present invention with a balanced pipeline architecture. Most of the texture computations occur during the rasterization process. Texture coordinates are carried through the pipe with each vertex. During the scan conversion process, texture coordinates are iterated with the other polygon parameters at each screen pixel. The twenty or forty parallel Image Engines (IE) simultaneously texture a polygon and blend it into the display.

In order to minimize texture mapping inaccuracies, especially those associated with the display an object in perspective, Z subdivision of objects is provided by the present invention. The Z subdivision technique of the present invention consists of slicing an object wherever it intersects planes in space of constant Z, such that the separation of these Z planes differs by a predetermined amount. The separation between Z planes is determined in order to reduce texture mapping inaccuracies to a level where they are not noticeable to an observer.

In order to perform Z subdivision, a displayable object is decomposed into a set of primitives. Each primitive may be a line segment (i.e. edges) or a polygon shape. Polygon primitives are further decomposed into a set of triangular (planar) primitive shapes. An array of Z planes is then generated, to be used with all primitives of the displayable object. Each primitive may intersect one or more Z planes, thereby producing a set of component portions of the primitive, each component portion being defined by the intersecting Z plane and the edges of the primitive. Alternatively, a primitive may not intersect any Z plane; in this case, a component portion is defined as the entire primitive itself. Component portions include line segments having two or more associated points. Component portions also include regions having three to five associated vertices. Once a primitive is sliced into component portions, a texture is mapped onto each component portion by interpolating texture parameters to points on or within the component portion. Finally, the textured component portions are rendered on a display device thereby creating a seamless complete object.

DETAILED DESCRIPTION OF THE PREFERRED EMBODIMENT

Figure 1:
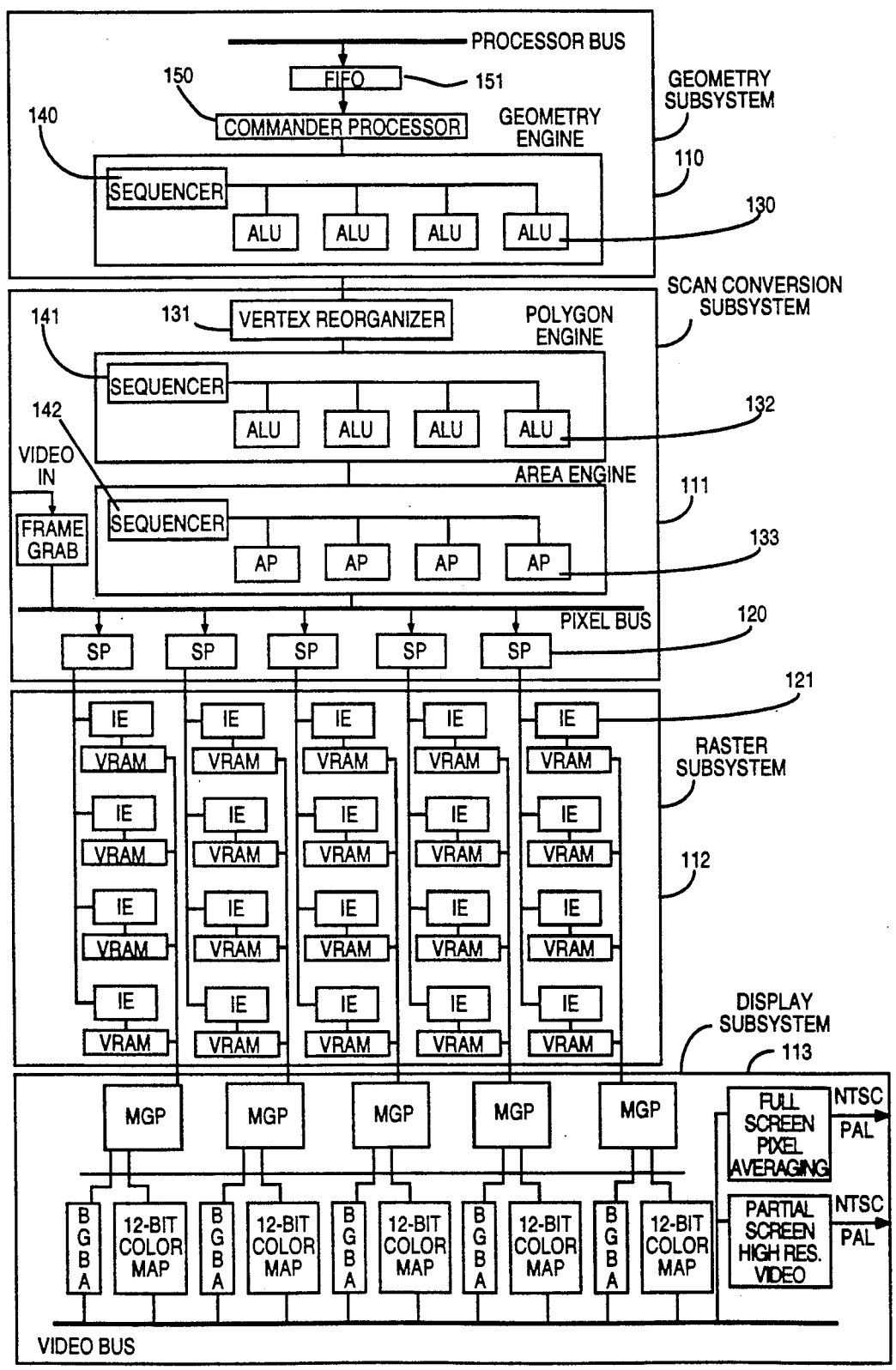
FIG. 1 is a block diagram illustrating the major components of the hardware of the present invention.

A means and method for Z subdivision of graphical objects is described for improving texture mapping accuracy. In the following description, numerous specific details are set forth in order to provide a thorough understanding of the present invention. It will be apparent, however, to one of ordinary skill in the art that the present invention may be practiced without these specific details. In other instances, well known structures and techniques have not been shown in detail in order not to unnecessarily obscure the present invention.

The present invention provides a means and a method for slicing polygons into quadrilaterals and triangles whose vertices are arranged between two adjacent Z planes. This slicing allows both atmospheric and texture parameters to be interpolated linearly with minimal error within each quadrilateral or triangle slice.

A host computer (CPU) of the preferred embodiment provides the graphics subsystem with the visual description of 3D objects. This visual description takes the form of drawing commands and world coordinate vertex data. The description describes the object's geometric position, color, and surface normal vectors used for complex lighting calculations. The graphics architecture of the present invention performs transformations and other graphics operations to calculate specific pixel values for each of the 1.3 million pixels on a 1280×1024 high-resolution display. It will be apparent to those skilled in the art that equivalent systems may be implemented with a different number of pixels on the display system. Object data from the host computer is processed by four pipelined graphics subsystems before being displayed on the screen: 1) a Geometry Subsystem, 2) a Scan Conversion Subsystem, 3) a Raster Subsystem, and 4) a Display Subsystem.

The Geometry Subsystem receives graphical data from the host computer and converts it to screen-space data. Screen-space data defines an object's position in a screen coordinate system corresponding to the visible plane of the display monitor screen. The Scan Conversion Subsystem then breaks down points, lines, polygons, and meshes thereby producing pixel data. This pixel data is sent to the Raster Subsystem where a Z-buffer removes hidden surfaces. The Raster Subsystem also performs various blending and texturing functions on a pixel-by-pixel basis as the pixels are written to image bit-planes, or a frame buffer. Finally, the Display Subsystem reads the frame buffer and displays the image on a color monitor.

Parallelism is exploited extensively throughout the present invention graphics architecture. The single-instruction, multiple-data (SIMD) organization of the geometric subsystem allows up to four primitives to be processed in each of two pipeline elements. The MIMD organization of the scan conversion and raster subsystem allows up to 200 million pixels to be processed per second.

The graphics subsystem of the present invention uses one-megabit video random access memory (VRAMs) to construct a high-resolution frame buffer with configurations ranging from 140 through 268 bits per pixel. This high capacity allows storage of color, depth, texture, and numerous other special-purpose data fields to support advanced rendering features.

GEOMETRY SUBSYSTEM

The Geometry Subsystem is connected to the parallel processing CPU subsystem via a data bus interface. This subsystem receives world coordinate geometric data over the bus, performs specified transformations and lighting computations, and sends the screen-space data to the Scan Conversion Subsystem. The major components of the Geometry Subsystem are the Command Processor and the single-instruction, multiple-data (SIMD)-organized Geometry Engine.

The Command Processor (CP) of the present invention receives command tokens and data from the bus and distributes command packets to the four Geometry Engine modules. The CP accepts coordinate data from the host computer in four formats: 16-bit integer, 24-bit integer, 32-bit IEEE floating point, and 64-bit IEEE double-precision floating point. Color data is also accepted in packed byte format.

The Command Processor converts all incoming data words to a uniform floating point format regardless of the input representation. In addition, for each 3-dimensional vertex specified, the CP fills in any parameters not supplied by the user. Values from a repository of current values previously specified are used to fill in parameters not supplied. The CP then outputs a complete packet of parameters. An input FIFO buffers data from the host computer, thus eliminating unnecessary protocol overhead.

GEOMETRY ENGINE

The Geometry Engine (GE) contains four identical floating point processor data paths. Each processor module 130, implemented in the preferred embodiment using a 74ACT8867 chip, manufactured by Texas Instruments, Inc., is capable of 32 million floating point operations per second (MFLOPS), giving a peak aggregate rate of 128 MFLOPS. The Geometry Engine processes a stream of high-level graphics commands mixed with single-precision, floating point data. Each GE processor module 130 includes local memory data. The four processor modules 130 act together as a SIMD machine under control of a centralized microsequencer 140, operating on up to four graphic object vertices simultaneously. The Geometry Engine is designed to have a very short latency time for maximum throughput efficiency.

The first Geometry Engine task is to perform matrix operations on incoming vertices. Each Geometry Engine uses a $4 \times 4$ matrix stack to rotate, translate, and scale 2D and 3D homogeneous coordinates. A $3 \times 3$ normal matrix stack is also used to transform surface normals.

The next Geometry Engine task is to light the vertices. The GE maintains the position, direction, and intensity specifications for lighting calculations. It supports up to eight point-source lights or spotlights; material specifications including ambient, diffuse, and specular reflectance parameters; and lighting model information. The color applied to each transformed vertex is a function of the vertex position, the surface normal direction, the lighting model, the lights, and the characteristics of the surface. The result of the lighting calculation is either a set of eight-bit red, green, blue, and alpha values (in RGB mode) or a single 12-bit color index (in color index mode).

Additional steps of the vertex computation include performing depth-cued color calculations, clipping colors to the required eight-bit range, and decomposing polygons with five or more vertexes into triangular and quadrilateral primitive shapes.

A first portion of the Z-subdivision processing of the present invention occurs in the Geometry Engine. Each of the four processor modules 130 contain processing logic for decomposing an object into triangular primitives, generating an array of Z planes, and further decomposing the triangular primitives into component portions (i.e. Z plane slices). The specific operation of this logic is described below and illustrated in FIGS. 5-8.

SCAN CONVERSION SUBSYSTEM

Screen coordinates sent from the Geometry Engine to the Scan Conversion Subsystem specify points and the vertices of lines and polygons in the screen coordinate space. The Scan Conversion Subsystem performs the calculations required to reduce vertex data to individual pixels. Each pixel is assigned an X, Y screen position, plus a number of parameters per pixel, including Z, red, green, blue, alpha, and texture parameters s and t. These parameters are usually linearly interpolated between vertices and between the edges of polygons.

The task of scan-converting polygons is partitioned into separate processors within each of the processing engines in the Scan Conversion Subsystem: the Vertex Reorganizer, the Polygon (Poly) Engine, the Area Engine, and the Span Processor.

Floating point precision is used in the stages up to and including the Poly Engine to maintain coordinate integrity when calculating slopes. The third processor, the Area Engine, maintains this precision in a fixed point format, and maintains fractional coordinate accuracy.

All color, depth, and texture components are first corrected to an initial pixel center, then iterated in full-pixel steps. As a result, iterated values remain planar across polygonal surfaces, and subsequent Z-buffer calculations result in clean intersections. Furthermore, maintaining fractional X and Y screen position information for all primitives enables correct multi-pass jittering operations.

The first processor, the Vertex Reorganizer (VR), arranges the stream of commands and floating point data from the Geometry Engine into points, line segments, triangles, or quadrilateral primitives, depending on the command type. The VR sends from one to four primitives on to the next stage, the Poly Engine. In the case of meshes, the VR can distribute up to four triangles to the four Poly Engine modules. The VR also sorts triangle and quadrilateral vertices by their X coordinate to facilitate later computations.

The Poly Engine is a four-module SIMD floating point processor that is nearly identical in structure to the Geometry Engine. The Poly Engine begins the scan conversion process by calculating a number of parameters pertaining to the triangle, such as the edge and parameter values at the leftmost pixel sample covered, and the parameter slopes in the X and Y directions. Cohen-Sutherland clipping, when actually required, is also performed in the Poly Engine. This form of clipping is well known in the art.

The area Engine (AE) is a set of four fixed-point processor modules under control of a single microprogrammed sequencer. The Area Engine converts floating point initial value and slope information to produce X, Y, and parameter values for individual spans of pixels that lie between the top and bottom edges of a triangle. For each X coordinate covered by the triangle, the AE iterates the pertinent two edges and produces new Y intercepts and exact parameter values along one of the edges. The AE passes this information along with the Y-direction slopes to the Span Processors.

Intercepts and parameter slopes are received by one of five or ten Span Processors. In the basic five span processor configuration of the preferred embodiment, each processor handles one-fifth of the 1280 visible screen columns. Span processor 0 manages columns 0, 5, 10, etc.; Span Processor 1 manages columns 1, 6, 11, etc. Since spans generated from a single polygon are always adjacent, the span processing load is evenly distributed across the five processors. Ten-span systems distribute the load similarly, with each span handling every 10th iteration of pixels.

Each Span Processor iterates from the given starting Y address to the ending Y address, using the slope data to generate Z, color, and texture values in the given column. These values are passed to the Raster Subsystem to be used to update the display.

A second portion of the Z-subdivision processing of the present invention occurs in the Poly Engine. Each of the four processor modules 132 within the Poly Engine contain processing logic for decomposing Z plane slices into triangular regions for output to the Area Engine. The specific operation of this logic is described below and illustrated in FIG. 9.

RASTER SUBSYSTEM

The Raster subsystem contains 20 or 40 Image Engines, each of which control a portion of the screen in a two-dimensionally interleaved fashion. In the 20-engine configuration, a single Image Engine controls 65,536 screen pixels. Each pixel is composed of at least 144 bits of data, which is stored in frame buffer memory.

The Raster subsystem includes image bit plane memory. This memory stores 32 bits of R, G, B, and Alpha information for each pixel of the 1280×1024 display of the preferred embodiment. The architecture of the preferred embodiment contains two of these buffers (a total of 64 bits) to support either double-buffered 32-bit color (R, G, B, and Alpha) or double-buffered 12-bit color index styles of drawing and displaying.

The Raster subsystem also includes a 24-bit signed Z-buffer. The 24-bit Z coordinate associated with each pixel is stored in the Z-buffer planes. When hidden-surface removal is performed, the Z coordinate of an incoming pixel is compared to the current depth value already stored in the bit planes. If the incoming Z coordinate is closer to the user's viewpoint, and therefore visible, the color value of the new pixel is used to update the image bit planes, and the new Z coordinate value is written into the depth planes at the same location. Conversely, if the incoming Z coordinate is farther from the viewer, the new color value is ignored.

The eight remaining bits in the depth bank are designated as stencil planes. The Image Engines have the ability to conditionally clear, write, increment, and decrement these planes independent of the 24-bit depth value. This capability allows pixels to be tagged as a way of extending the capability of the depth buffer to do a number of prioritizing algorithms.

TEXTURE PLANES

One bank of memory is dedicated for storing 65,536 "texels", or texture map elements. Each texel is composed of R, G, B, and Alpha fields just as in the image planes. Based on the s and t texture parameters iterated by the Scan Conversion Subsystem, the Image Engine calculates and looks up elements in a selected texture map. The color data from this map can then be used along with the incoming color value to update the image bitplanes with a textured pixel value.

DISPLAY SUBSYSTEM

The Display Subsystem receives pixel information from the frame buffer, routes it through the appropriate display mode, and sends it to the Digital-to-Analog Converters for display. Five Multimode Graphics Processors (MGPs) read and interpret the contents of the Image Planes. The graphics system of the present invention displays multiple images simultaneously, in an overlapping window environment, in single-buffered RGB, double-buffered RGB, single-buffered color-index, and double-buffered color-index color modes.

The MGPs allow simultaneous display of up to 16 unique window styles. This allows users to display both static and dynamic images at will, without having to consider the underlying color representation scheme. The MGPs position and draw the user-definable graphics cursor or a full-screen crosshair cursor and incorporate a 64×28 bit auxiliary color look-up table for overlays and underlays.

Linear RGB or mapped color indexed data is read from ten VRAMS in parallel onto the Video Bus. Data is sent via the Video Output Formatter to be displayed. High-speed Digital-to-Analog Converters (DACs) drive the red, green, and blue electron guns of a color display. When the graphics system of the present invention operates in a RGB color mode, the DACs receive up to 24 bits of color information for each pixel. Eight of these bits are directly assigned to each of the red, green, and blue DACs thereby yielding more than 16 million colors. The DACs are multiplexed to handle the input from the five parallel sources. In color-index mode, pixel data packets are used as indices into a 12-bit-in and 24-bit-out color map before being sent to the DACs. The pixel-mapping feature of the color-index mode allows screen colors to be quickly modified by simply changing the values stored in the color maps. The graphics system of the present invention also provides the capability to output the contents of an alpha buffer. The alpha buffer is useful for video applications including compositing, which require coverage information on a per pixel basis to blend different images together in the same scene.

TEXTURE MAPPING

Computer graphics displays can be greatly enhanced with the use of texture mapping. Texture mapping has traditionally been used in fields such as visual simulation and computer animation to enhance scene realism. The graphic system of the present invention provides high-quality texture mapping of geometric surfaces at interactive rates. A texture is a function defined in texture space that is warped, or mapped, by a specified mapping into an object space. Textures can be used to add vegetation and trees to barren terrain models without adding geometric complexity. Labels can be applied on computer-modeled package designs to get a better appreciation of how actual products will look. In addition to scene realism, interactive texturing also facilitates visualization of user data. Patterns mapped on to geometric surfaces can provide additional motion and spatial cues that surface shading alone cannot provide. For example, a sphere rotating about its center appears static when displayed as a shaded surface; however, by affixing a pattern to the sphere, its motion is easily detected. In fields such as scientific visualization, it is desirable to display changing properties of an object on its surface. Interactively texturing a surface as a function of these changing properties is an excellent way to accurately visualize this information.

Although the texture function, or texture for short, can be an arbitrarily dimensioned array of data, this preferred embodiment discloses the use of 2 D images, the most commonly used textures. Similarly, the preferred embodiment describes mappings only onto geometric primitives in 3 D space, namely polygons, lines, and points.

ARCHITECTURE

Interactive texture mapping is achieved on the graphics hardware of the present invention with a balanced pipeline architecture. Most of the texture computations occur during the rasterization process. Texture coordinates are carried through the pipe with each vertex. During the scan conversion process, texture coordinates are iterated with the other polygon parameters at each screen pixel. The twenty or forty parallel Image Engines (IE) simultaneously texture a polygon and blend it into the display. Since IEs are fully programmable, a variety of texture mapping algorithms can be implemented in the architecture. Texture memory contention is eliminated by giving each Image Engine its own copy of the texture map. Image Engine memory usage is flexible; up to 640K-bytes in each Image Engine can be dedicated to texture storage. Textures as large as 256×256 RGBA pixels can be applied to geometry in one pass, and textures up to 32K×32K are supported by the hardware of the present invention using a multi-pass technique.

It is essential that errors are minimized during the texture mapping process, as artifacts, such as texture aliasing, become much more apparent at interactive rates. Perspective correction of texture coordinates is performed during the scan-conversion process to prevent textures from "swimming" as an object moves in perspective. Without this correction, a texture would appear like a rubber sheet fixed to an object's vertices, which distorts as the object moves.

Texture aliasing is minimized by filtering the texture for each pixel textured. Without filtering, textures on surfaces appear to sparkle as surfaces move. Filtering is accomplished using techniques well known in the art. Prefiltered representations of a texture are computed at different levels of resolution. For each pixel that is textured, an interpolated texture value is derived by sampling pixels from the two maps closest to the required texture resolution for the pixel. Eight bits of subpixel positioning are used to interpolate between texture pixels and map levels. Textures can have 8, 16, 24, or 32 bits per pixel.

A variety of texture types and environments are provided to support the diverse applications of textures. Textures can be defined to repeat across a surface or to clamp outside of a texture's unit range. Textures can be monochrome or color, with alpha or without. Texture alpha can be used to make a polygon's opacity vary at each pixel. For instance, when an RGBA image of a tree is mapped onto a quadrilateral, objects behind the polygon can appear through the polygon wherever the opacity of the tree map is low, thereby creating the illusion of an actual tree.

Textures can be combined with their surfaces in a variety of ways. A monochrome texture can be used to blend between the surface color and a constant color to create effects such as grass on dirt or realistic asphalt. By adding alpha, a texture can be used to create translucent clouds. Textures can also be used to modulate a surface's color or be applied as a decal over a surface.

The present invention can automatically generate texture coordinates, based on user-specified behavior. This feature can be used to texture map contours onto an object without requiring the user to compute or store texture coordinates for the object.

The basic steps of the texture mapping process are:
1. Texture coordinates are assigned to vertices of an object to define a mapping from texture space to geometry in object space.
2. Next, a texture function is chosen to produce texture values from the interpolated texture coordinates.
3. Finally, the texture environment determines final color from input values produced by shading and the texture function.

TEXTURE COORDINATES

Figure 2:
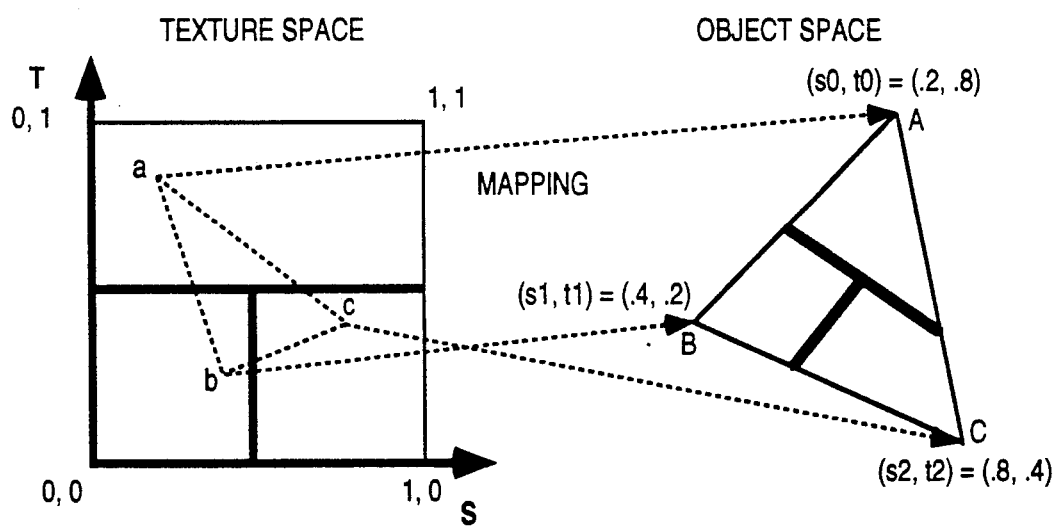
FIG. 2 illustrates how to map textures onto a geometry using texture coordinates.

FIG. 2 illustrates how to map textures onto geometry using texture coordinates and how texture coordinates are generated at screen pixels. Referring to FIG. 2, coordinate axes s and t define a 2 D texture space. By definition, a texture lies in the range 0 to 1 along both axes. Coordinate pairs (s,t), which are not necessarily limited to this range, are used to index the texture.

To define a mapping, texture coordinates (a,b,c) are assigned to the vertices of a geometric primitive (A,B,C); this process is call parameterization. FIG. 2 shows a parameterized triangle and how the parameterization defines the mapping between coordinate systems.

Next, the current texture matrix transforms the texture coordinates. This matrix is a standard 2 D transformation matrix. Thus, the (s,t) pair is treated as a 2 D point and is transformed accordingly.

The final step generates s and t at every pixel center inside a geometric primitive by interpolating between the vertex texture coordinates during the scan conversion process. Many prior art graphic systems use hardware to linearly interpolate texture coordinates. Although hardware interpolation is very fast, it is incorrect for perspective projections. The Z subdivision technique of the present invention improves s and t interpolation—and consequently image quality—for perspective projections.

The graphics system of the present invention renders objects made up of polygons. This system operates most efficiently with planar polygons, but need not be limited to planar polygons. Each polygon of each object is partitioned into a plurality of non-overlapping triangles. Triangles are particularly easy to scan convert since, for Gouraud interpolation, parameter slopes are constant across the triangle. Techniques for partitioning polygons into triangles and for performing Gouraud interpolation are well known in the art.

TEXTURE MAPPING INACCURACIES

Graphics hardware typically performs the scan conversion process by interpolating parameters linearly in screen space. Screen space is a coordinate system where the X and Y axes are in the plane of the display screen and the Z axis extends perpendicularly out of the screen. Eye space is oriented from a position where an observer would view objects on the display screen. By interpolating parameters, intermediate points in the triangles of an object can be colored or shaded in a manner corresponding to the texture map. This linear interpolation can be represented parametrically. For a given parameter P along a line (for example, a triangle edge), and a parameter t where $0 <= t <= 1$, $$Pt = P0 + t(P1 - P0).$$

Figure 3A:
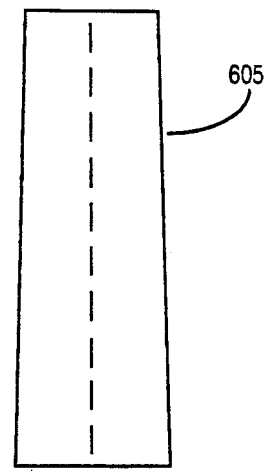
FIGS. 3a-3c illustrate a displayable object shown in perspective.
Figure 3B:
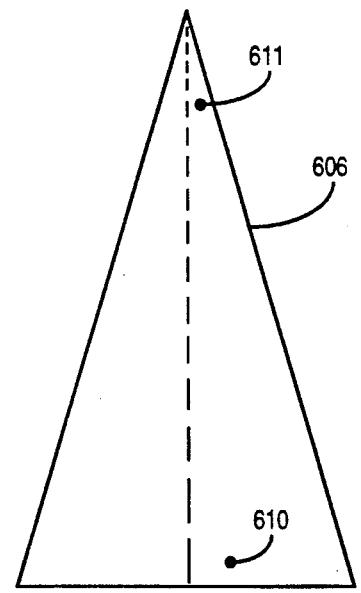
Figure 3C:
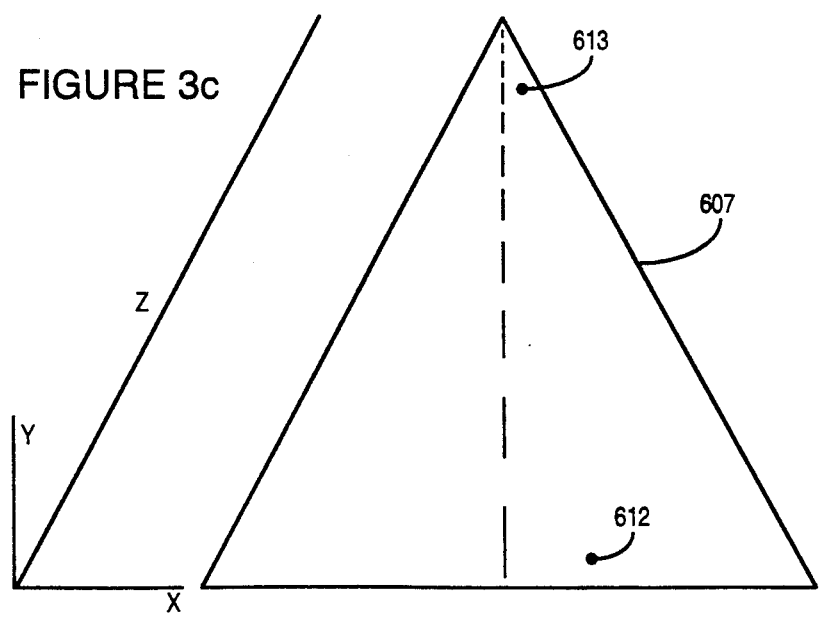

Linear interpolation is a technique well known in the art. With linear interpolation, however, a problem occurs in mapping a parameter (image) onto an object where perspective projection is used. Perspective projection causes redistribution of parameters when an object in eye space is scaled by z. As the projection becomes more forced, the redistribution of parameters becomes more severe. Referring to FIGS. 3a-c, a sample object 605 (i.e. a road) is depicted. The road object can be displayed as a quadrilateral or triangle with an asphalt texture added from a texture map. In FIG. 3a, the road object 605 is depicted with only a slight degree of perspective. This occurs when the object is distant from the eye of the observer. As the distance to the object in eye space diminishes, as illustrated in FIGS. 3b-c, the projection of the object becomes more forced. As an observer would expect, the texture of the object at points 610 close to the observer would contain more detail than points 611 more distant from the observer. This effect becomes more evident as the size of the object increases. Thus, as shown in FIG. 3c, the relatively short distance from the object to the eye of the observer combined with the large size of the object (especially the Z dimension) create a highly forced projection and necessitate a more significant redistribution of parameters in order to correctly depict the object in perspective. As the perspective becomes more forced, texture mapping inaccuracies become evident.

In order to illustrate these inaccuracies in mathematical terms, let (Xe, Ye, Ze) be an object coordinate in eye space, and (Xs, Ys, Zs) be coordinate projected to screen space. Therefore:

$$Xs = K*Xe/Ze$$

$$Ys = K*Ye/Ze$$

$$Zs = K/Ze.$$

K is a value related to the distance of the coordinate to the plane of projection (D) and the size of projection (Q): K=D/Q.

The texture mapping inaccuracy that occurs can be summarized by calculating the difference between t in screen space and the corresponding t in eye space (te) for the parameterized line or edge of an object:

$$te = \frac{t(Zs0)}{Zs1 + t(Zs0 - Zs1)}$$

The farther apart Zs0 and Zs1 become, the greater the difference between te and t, and thus the greater the mapping error. One way to eliminate this error is to calculate te at every point on a surface to be scan converted. This technique, however requires powerful processors or an excessive length of time to complete a scan conversion. In order to display an object correctly in perspective without processing every point, the difference between Zs0 and Zs1 must be minimized. This difference is minimized using the Z subdivision technique of the present invention.

Z SUBDIVISION

The Z subdivision technique of the present invention consists of slicing an object into component regions wherever it intersects planes in space of predetermined or constant Z, such that Zs0 and Zs1 differ by a predetermined amount. The difference between Zs0 and Zs1 is determined in order to reduce the difference between t and te to a level where texture mapping inaccuracies are not noticeable to an observer. Once an object is decomposed into Z-sliced component regions, different texture filters may be used on each component region thereby producing a more realistic image, especially an image in a perspective view.

The Z subdivision process of the present invention starts by decomposing a displayable object into a set of primitives. Each primitive may be a line segment (i.e. edges) or a polygon shape. Polygon primitives are further decomposed into a set of triangular (planar) primitive shapes. An array of Z planes is then generated, to be used with all primitives of the displayable object. Each primitive may intersect one or more Z planes, thereby producing a set of component portions of the primitive, each component portion being defined by the intersecting Z plane and the edges of the primitive. Alternatively, a primitive may not intersect any Z plane; in this case, a component portion is defined as the entire primitive itself. Component portions include line segments having two or more associated points. Component portions also include regions having three to five associated vertices. Once a primitive is sliced into component portions, a texture is mapped onto each component portion by interpolating texture parameters to points on or within the component portion. Finally, the textured component portions are rendered on a display device thereby creating a seamless complete object. A more detailed description of the processing logic used to perform Z subdivision is presented below.

This slicing (i.e. Z subdivision) may be accomplished in eye space with equally spaced component regions or slices. Equivalently, Z subdivision may be performed in screen space with equally spaced slices. Z subdivision may also be done with unequally spaced slices in eye or screen space. The slicing technique chosen depends on the best method to minimize the errors for the type of objects displayed.

A key to correct scan conversion of a scene is making sure the slices created merge to create a seamless scene. Since scan conversion hardware is rarely perfectly accurate, it is important to slice all edges or polygons in the scene using the same Z planes. This prevents the creation of "T vertices;" that is, a different slicing for polygons that share an edge. Thus, the criterion used for slicing planes should not be dependent on the Zs values for each polygon.

Using any of the three slicing techniques described above, a number of planes of constant Z are defined. The number of planes necessary depends upon the quality of the image desired and the computing power and processing time available for the scan conversion. One formula for determining the number of Z subdivisions (N=number of slices) necessary is as follows:

$$N = a(Q/D) + b$$

where a and b are display image quality constants. The number of slices should increase as the perspective projection of an object becomes more forced. This degree of perspective is reflected in the above equation by the occurrence of D (the distance of the coordinate to the plane of projection) and Q (the size of projection) as described above.

PROCESSING LOGIC OF THE PRESENT INVENTION

Figure 4:
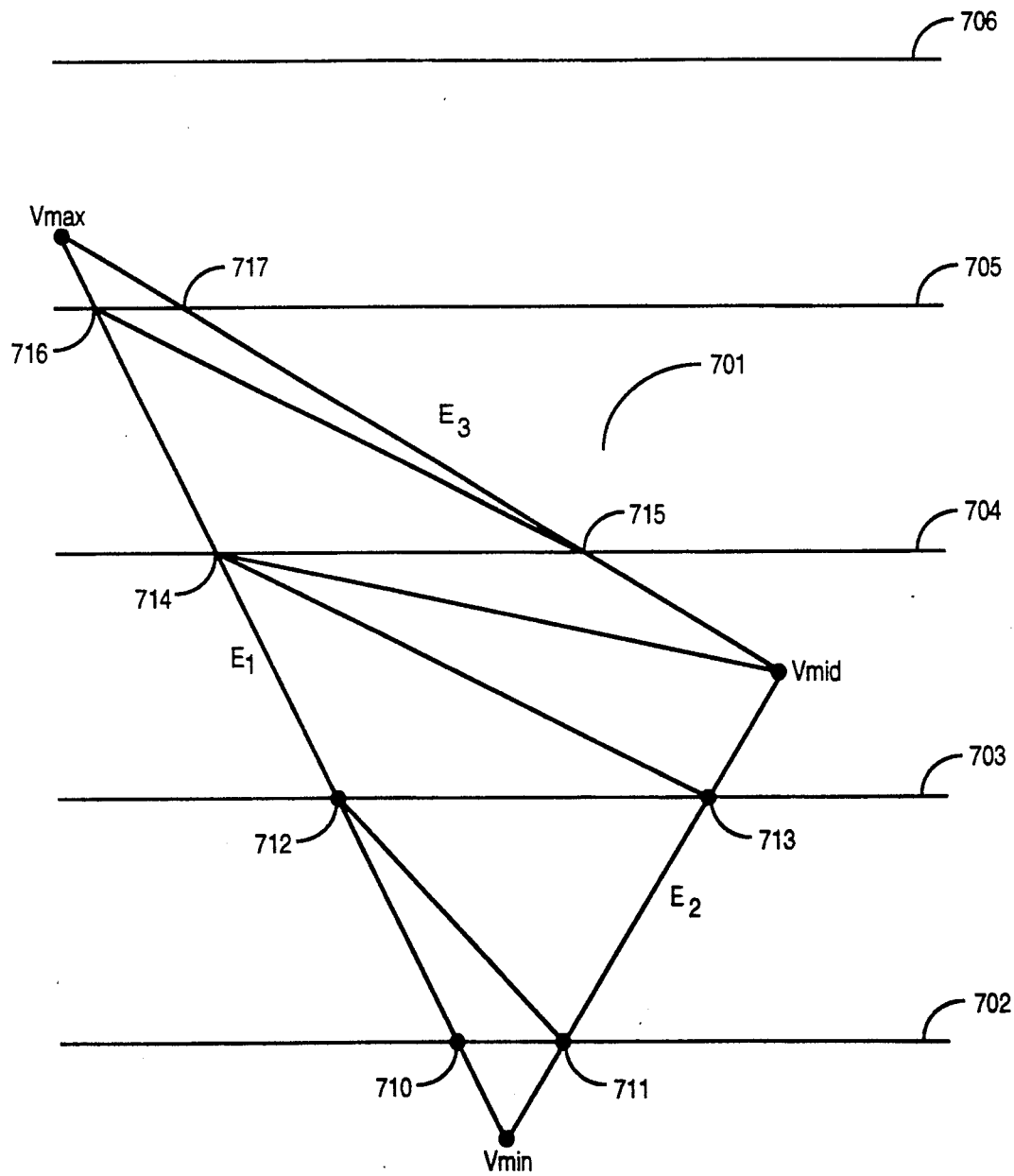
FIG. 4 illustrates a triangle primitive being Z subdivided by the present invention.

In order to illustrate the processing logic of the present invention, reference is made to the triangle 701 illustrated in FIG. 4. Triangle 701 represents one polygon primitive of an object comprising many such triangular primitives. As described above, techniques are well known in the art for decomposing an object into triangle primitives.

Each triangle primitive, such as triangle 701, consists of three vertices. Each vertex includes all of the parameters associated with the vertex, including x, y, and z position, red, green, and blue color components, and texture coordinates s and t. When processing is completed on a vertex, it is understood in the following description that processing is completed for each individual parameter of that vertex. Such a triangle is typical of the input provided to the logic of the present invention.

In addition to vertices and associated parameters for a triangle, an array of Z values (Zi where i=1 to N, the number of Z slices) for each subdivision is also available as input for the logic of the present invention. The Z value array may contain equally spaced or unequally spaced Z values. This array is generated in the manner described above.

The Z-subdivision technique of the present invention is used to slice triangle 701 at known Z positions (i.e. the Z value array) thereby producing quadrilaterals or sub-triangles between each Z slice. Referring to FIG. 4, one such quadrilateral is identified by points Va, Vb, Vc, and Vd. One such sub-triangle is identified by points Va, Vb, and Vmin. The quadrilaterals and sub-triangles of a primitive are output by the logic of the present invention. Quadrilaterals are subsequently decomposed into other sub-triangles. A consistent texture is thereafter applied to each component sub-triangle of the primitive.

Figure 7:
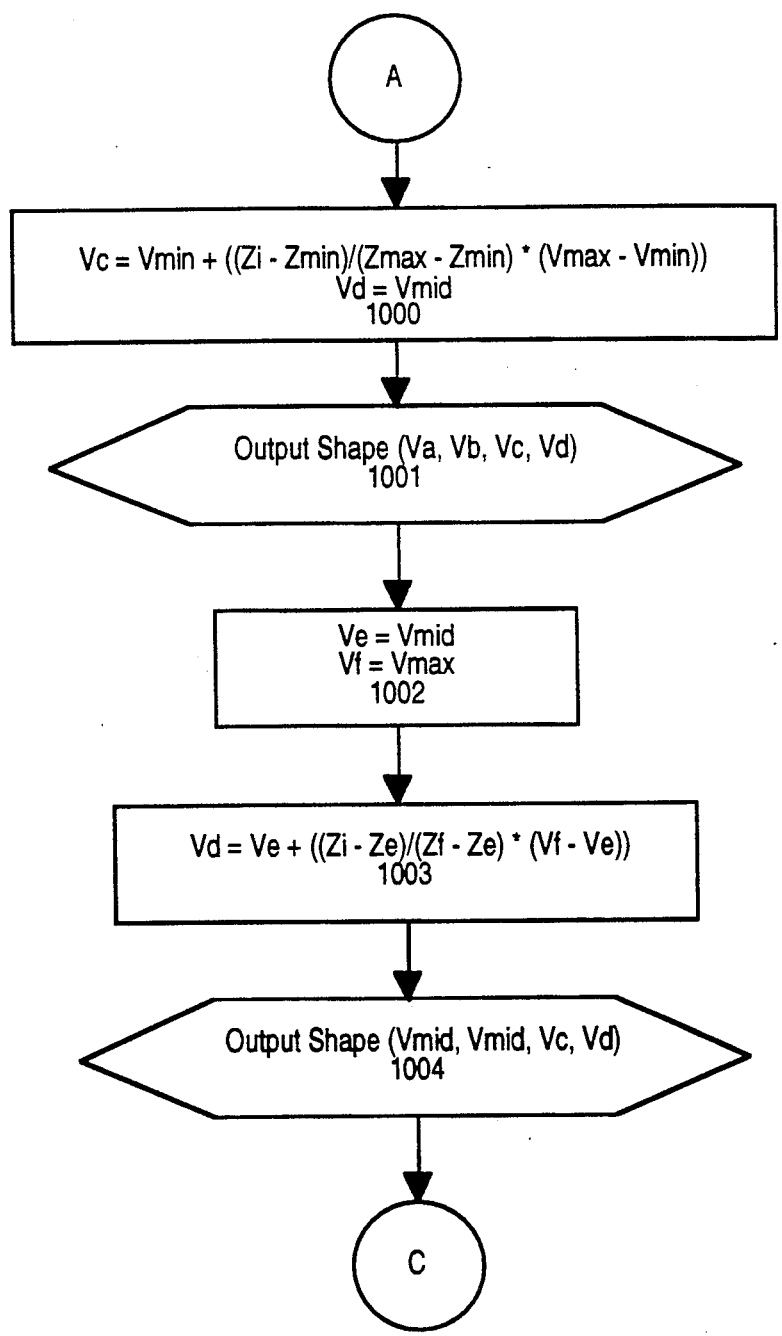
Figure 8:
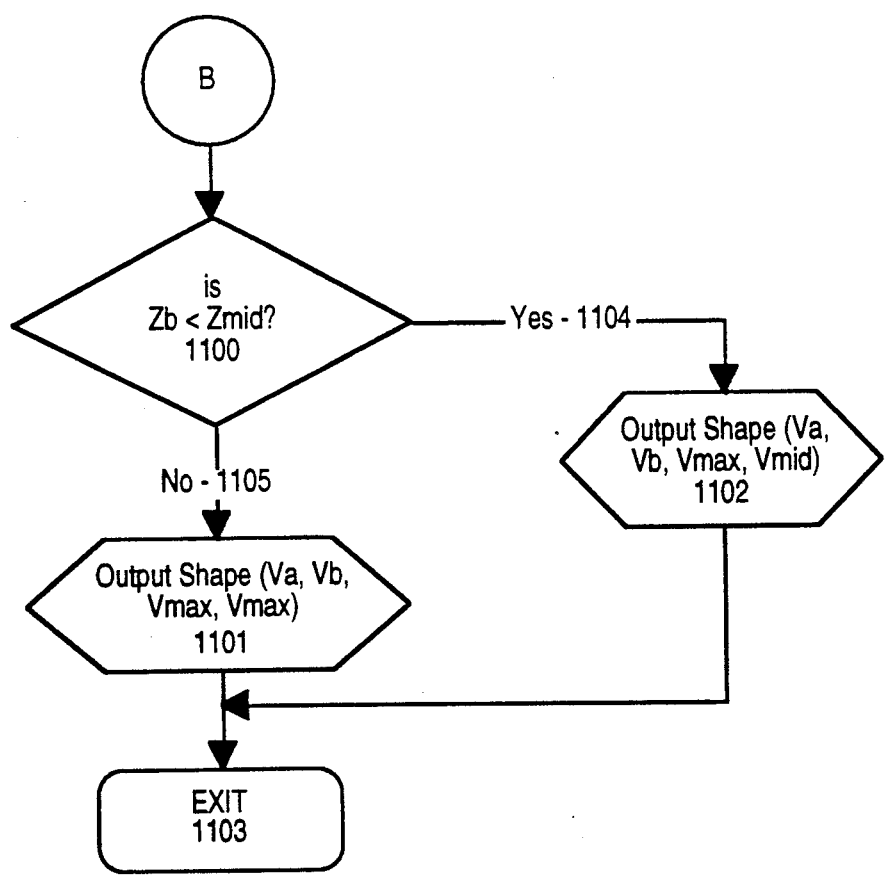
Figure 9:
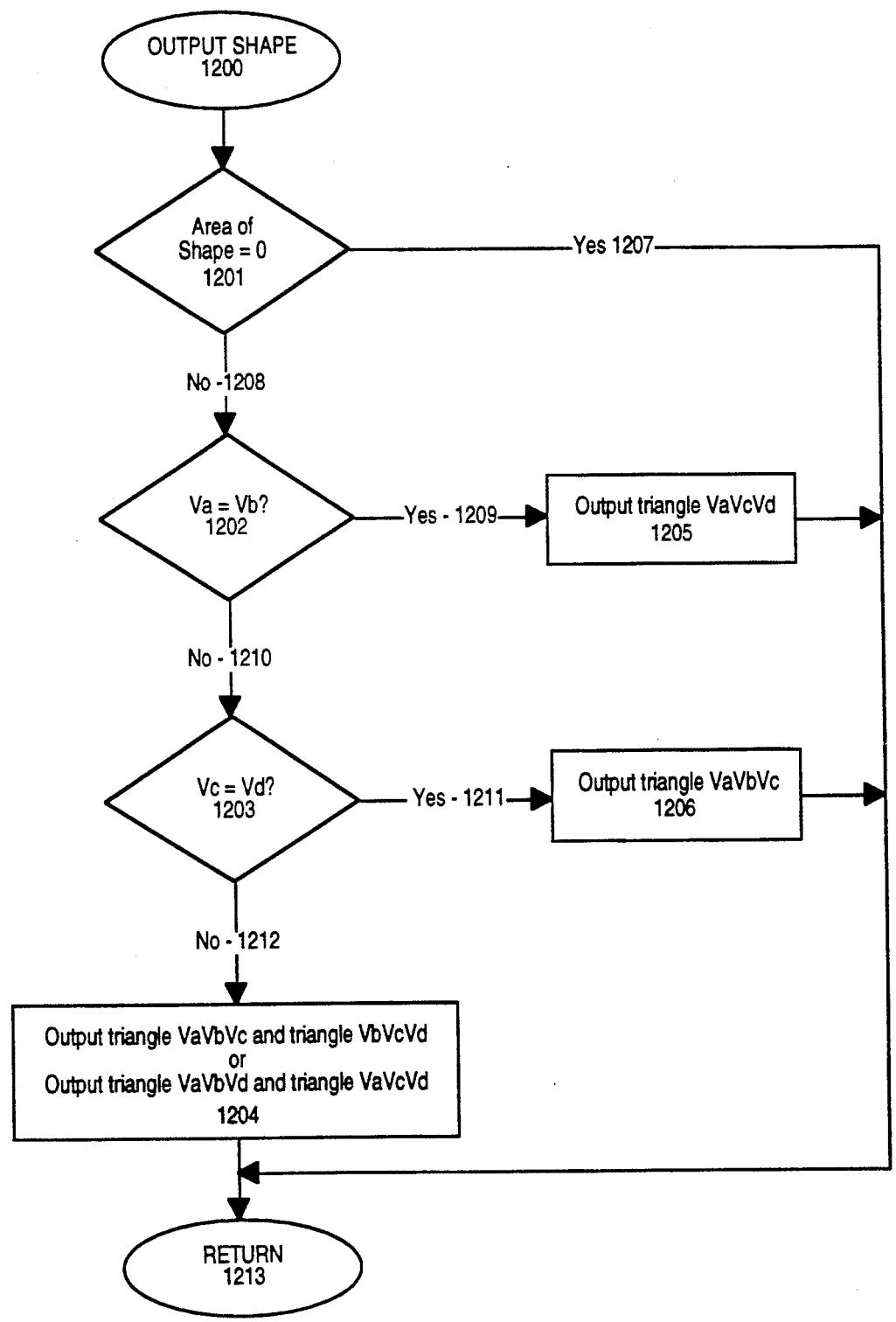

Referring now to FIGS. 5–9, flowcharts are used to best describe the processing logic performed by the present invention. In the preferred embodiment, a first portion of the Z-subdivision processing of the present invention, as illustrated in FIGS. 5–8, occurs in the Geometry Engine. A second portion of the Z-subdivision processing of the present invention, as illustrated in FIG. 9, occurs in the Polygon Engine. It will be apparent to one skilled in the art that the concepts of the present invention may equivalently be practiced using a single processor and a single processing logic component.

Figure 5:
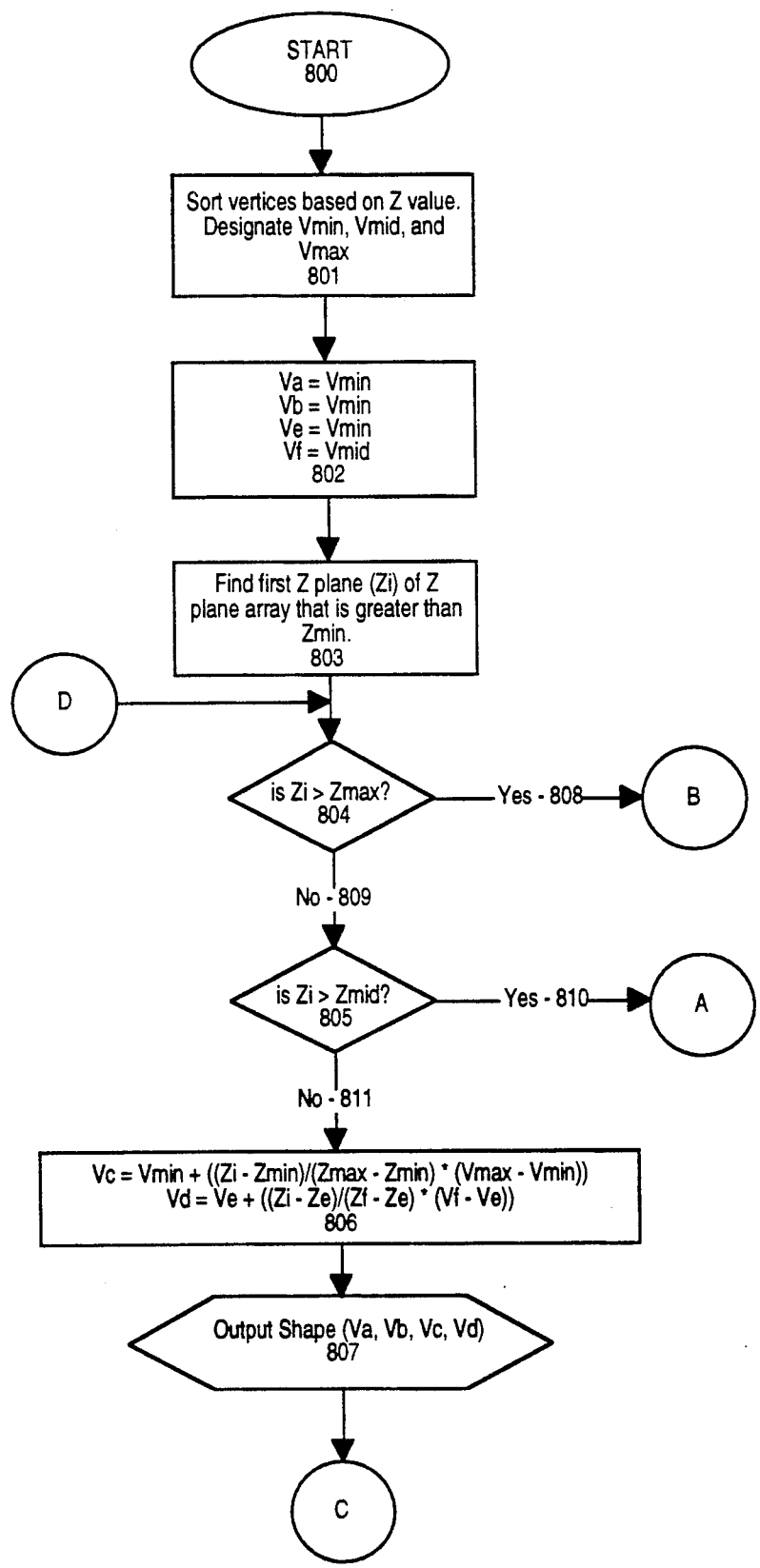
FIGS. 5-9 are flow charts of the logic of the present invention.

Once a triangle primitive of an object such as triangle 701 in FIG. 4 has been identified, the Z-subdivision function is performed on a triangle such as triangle 701 starting at the logic depicted in FIG. 5. First, the three vertices of triangle of 701 are sorted and designated based on their respective Z positions. The vertex of triangle 701 having the minimum Z value (Zmin) is denoted Vmin. The other two vertices Vmid and Vmax are denoted such that:

Z at Vmin ("Zmin") < = Z at Vmid ("Zmid") < = Z at Vmax ("Zmax").

These vertices are so designated in processing block 801.

Several internal registers Va through Vf are used to store intermediate values for vertices as the interactive process of the present invention runs to completion. These registers are located in each of the processor modules 130 of the Geometry Engine and each of the processor modules 132 of the Polygon Engine. Four such registers are initialized in processing block 802. Registers Va, Vb, Ve are all set to the value of the minimum vertex Vmin. Register Vf is initialized to the middle vertex Vmid. As described above, each vertex includes all the parameters associated with the vertex. Once registers are initialized, the Z value array is searched to find the first Z plane of the Z plane array that is greater than the Z value of Vmin (i.e. Zmin) (processing block 803). Once the Z plane is retrieved, a loop is entered starting with decision block 804. The test made a decision block 804 and decision block 805 are used to determine where the Z plane of the current iteration is located in relation to the vertices of triangle 701. If the current Z plane ($Z_i$) is greater than Zmax (decision block 804), processing path 808 is taken to the bubble labeled B as illustrated in FIG. 8. If not, processing path 809 is taken to decision block 805. If $Z_i$ is greater than Zmid (decision block 805), processing path 810 is taken to the bubble labeled A as illustrated in FIG. 7. If $Z_i$ is not greater than Zmax and not greater than Zmid, processing path 811 is taken to processing block 806. In the first iteration of triangle 701 illustrated in FIG. 4, processing path 811 is taken since the first Z plane 702 greater than Zmin is located at a position less than Zmax and less than Zmid. Register Vc is set to the quantity of:

Vmin + (($Z_i$ − Zmin)/(Zmax − Zmin)*(Vmax − Vmin)).

Note that for each vertex calculation, each of the vertex components (x, y, red, green, blue, alpha, s, t) is calculated based on the corresponding components of the other vertices in the equation. Similarly, register Vd is set to the quantity:

Ve + (($Z_i$ − Ze)/(Zf − Ze)*(Vf − Ve)).

This processing occurs in processing block 806.

Figure 6:
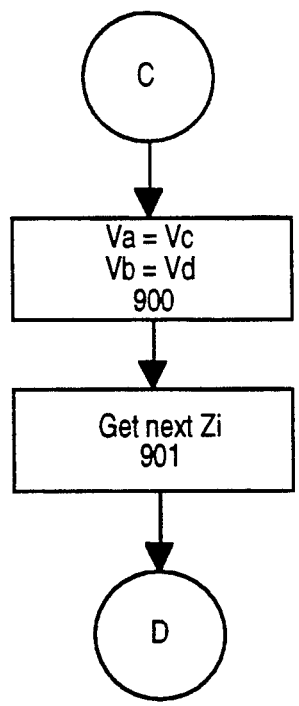

In the first iteration, the value computed and stored in register Vc corresponds to point 710 illustrated in FIG. 4. The value computed and stored in register Vd corresponds to point 711 illustrated in FIG. 4. Since registers Va and Vb are both set to values corresponding to Vmin, the shape defined by vertices Va, Vb, Vc and Vd correspond to the triangle illustrated in FIG. 4 defined by points Vmin point 710 and point 711. This triangle is output to the Area Engine via the Polygon Engine for routine scan conversion at processing block 807. Processing continues at the bubble labeled C as illustrated in FIG. 6 where parameters are set up for the next iteration. Register Va and Vb are set to the values of register Vc and Vd respectively (processing block 900). The next Z plane is retrieved from the Z plane array in processing block 901. Processing then loops to the bubble labeled D as illustrated in FIG. 5 for the next iteration with the new Z plane. In the second iteration, the new Z plane 703 as illustrated in FIG. 4 is processed. In this case, Z plane $Z_i$ is still less than Zmax and Zmid of triangle 701. Thus, processing path 811 is again taken to processing block 806. At processing block 806, the contents of registers Vc and Vd are again computed. This time, however, Vc corresponds to point 712 in FIG. 4 and register Vd corresponds to point 713 in FIG. 4. Since register Va was set to values corresponding to point 710 in processing block 900 of the previous iteration, and register Vb was set to values corresponding to point 711 in the previous iteration, register Va through Vd specify a quadrilateral defined by points 710 through 713 as illustrated in FIG. 4. This quadrilateral is decomposed into sub-triangles and output at processing block 807.

Referring now to FIG. 9, the method for decomposing a quadrilateral and outputting triangles to the Area Engine is described. Four vertices are provided as input to the logic of FIG. 9. If the area defined by the four input vertices is zero (decision block 1201), processing path 1207 is taken where no output is performed for the null shape. If two of the vertices Va and Vb are equal (processing path 1209), the four vertices define a simple triangle thus this triangle Va, Vc, Vd is output to the Area Engine via the Polygon Engine at processing block 1205. If vertices Vc and Vd are equal, the triangle Va, Vb, Vc is output at processing block 1206. If the four input vertices define a quadrilateral (processing path 1212), the quadrilateral must first be decomposed into two component sub-triangles. Thus, sub-triangle Va, Vb, Vc is output to the Area Engine along with triangle Vb, Vc and Vd. In an equivalent alternative implementation, triangle Va, Vb, and Vd can be output in combination with triangle Va, Vc, and Vd (processing block 1204). For the second iteration of the logic of the present invention, the triangle Va, Vb, Vc corresponds to the triangle defined by points 710, 711, and 712 as illustrated in FIG. 4. Similarly, the triangle Vb, Vc, Vd for the second iteration corresponds to the triangle defined by points 711, 712, and 713. Each of these of these triangles are output to the Area Engine for routine scan conversion. The output scheme may choose between the two triangulations based on a criterion that is constant regardless of the direction in which a polygon is scan converted, such as orienting it according to the order in which vertices were originally specified by the creator of the polygon.

Referring again to FIG. 4, the third iteration of the logic uses Z plane 704. Since Z plane 704 is greater than Zmid, processing path 810 is taken to the bubble labelled A as illustrated in FIG. 7. Referring to FIG. 7, processing for Z plane 704 is described. Since the area of triangle 701 between Z plane 703 and Z plane 704 cannot be defined by four vertices or less, special processing is required. From the previous iteration, the Vc register is set to values corresponding to point 712. Similarly, register Vd is set to values corresponding to point 713 as illustrated in FIG. 4. In processing block 1000 illustrated in FIG. 7, vertex values are computed and stored in registers Vc and Vd. First, register Vc is loaded with the quantity:

$$Vmin+((Z_i-Zmin)/(Zmax-Zmin)*(Vmax-Vmin)).$$

This computed value stored in the Vc register corresponds to values associated with point 714 illustrated in FIG. 4. Also in processing block 1000, the Vd register is set to values corresponding to Vmid. Thus, registers Va-Vd specify a quadrilateral defined by points 712, 713, 714, and Vmid as illustrated in FIG. 4. This quadrilateral is decomposed into sub-triangles and output to the Area Engine in processing block 1001. The two sub-triangles thus output are defined as a first triangle at points 712, 713, and 714 and by a second triangle at points 713, 714, and Vmid as illustrated in FIG. 4. Once this quadrilateral is output, processing block 1002 in FIG. 7 is performed. The Ve register is set to values corresponding to Vmid and the Vf register is set to the values corresponding to the Vmax vertex (processing block 1002). The Vd register is then set (processing block 1003) to a quantity:

$$Ve+((Z_i-Ze)/(Zf-Ze)*(Vf-Ve)).$$

The value thus computed and stored in register Vd corresponds to point 715 illustrated in FIG. 4. The triangle defined by points Vmid, point 714 and point 715 is output to the Area Engine at processing block 1004. Processing then continues at the bubble labelled C illustrated in FIG. 6 where a new iteration for the next Z plane is initialized.

Again following processing path 811, the quadrilateral defined by points 714-717 is output to the Area Engine in the manner described above. Once an iteration occurs where the Z plane $Z_i$ becomes greater than Zmax, such as Z plane 706 illustrated in FIG. 4, processing path 808 is taken to the bubble labelled B as illustrated in FIG. 8.

Referring now to FIG. 8, Zb (Z component of Vb) is tested against Zmid (decision block 1100). If Zb is less than Zmid (processing path 1104), Vmid must be included in the shape output to the Polygon Engine. In this case, the quadrilateral defined by vertices Va, Vb, Vmax, and Vmid is sent to the Polygon Engine for output to the Area Engine (processing block 1102). Since Zb (currently point 715) is not less than Zmid (processing path 1105), the triangle defined by vertices Va, Vb, and Vmax is sent to the Polygon Engine for output to the Area Engine (processing block 1101). Z subdivision processing for the triangle 701 illustrated in FIG. 4 is thereby completed at termination bubble 1103.

Thus, a means and method for Z subdivision of graphical objects for improving texture mapping accuracy is described.

Although the invention has been described herein with reference to a specific embodiment, many modifications and variations therein will readily occur to those skilled in the art. For example, it will be apparent to those skilled in the art that the concepts of the present invention will apply equivalently to the Z-subdivision and display of objects comprised purely of polygons, lines or a combination of polygons and lines. Accordingly, all such variations and modifications are included within the intended scope of the present invention as defined in the following claims.

We claim:

1. A graphical display system for texture mapping and for visibly displaying objects, comprising:
   means for decomposing a displayable object into a set of primitives;
   means for generating an array of at least three Z planes;
   means for creating a set of component portions of each primitive of said set of primitives, each portion of said set of component portions being intersected, if at all, by no more than two Z planes of said array of Z planes;
   said means for creating a set of component portions utilizing said array of at least three Z planes in creating all component portions for said displayable object;
   means for mapping a texture onto a portion of said set of portions; and
   means for rendering said portion on a display device such that said set of portions display said object as a seamless complete object.

2. The graphical display system as claimed in claim 1 wherein said means for mapping a texture maps said texture by interpolating points of said portion.

3. The graphical display system as claimed in claim 1 wherein said set of component portions of said primitive includes a polygon region having at least three associated vertices.

4. The graphical display system as claimed in claim 3 wherein said means for creating a set of component portions further includes:
   means for sorting said vertices of said polygon region based upon a Z coordinate of each said vertex; and
   means for determining if a Z coordinate of a Z plane of said array of Z planes is greater than said Z coordinate of each said vertex of said polygon region.

5. The graphical display system as claimed in claim 3 wherein said means for creating a set of component portions further includes:
   means for generating a triangular region having three vertices, at least one of said three vertices corresponding to a point of intersection between a Z plane of said array of Z planes and said polygon primitive.

6. The graphical display system as claimed in claim 1 wherein said means for decomposing decomposes said displayable object into triangle primitives.

7. The graphical display system as claimed in claim 1 wherein said means for generating an array of Z planes generates each Z plane of said array of Z planes an equal distance from an adjacent Z plane.

8. The graphical display system as claimed in claim 1 wherein said means for generating an array of Z planes generates each Z plane of said array of Z planes an unequal distance from an adjacent Z plane.

9. The graphical display system as claimed in claim 1 wherein said means for creating a set of component portions further includes:
    means for generating a quadrilateral region having four vertices, at least one of said four vertices corresponding to a point of intersection between a first Z plane of said array of Z planes and said polygon primitive, at least one of said four vertices corresponding to a point of intersection between a second Z plane of said array of Z planes and said polygon primitive, said first Z plane and said second Z plane being adjacent to each other.

10. The graphical display system as claimed in claim 9 wherein said means for generating a quadrilateral region further includes a means for decomposing said quadrilateral region into triangular regions, said triangular regions having three of said four vertices of said quadrilateral region.

11. The graphical display system as claimed in claim 1 wherein said means for mapping a texture includes means for linearly interpolating texture parameters for each said portion created by said means for creating a set of component portions.

12. In a graphical display system, a process for texture mapping and for visibly displaying objects comprising the steps of:
    decomposing a displayable object into a set of primitives;
    generating an array of at least three Z planes;
    creating a set of component portions of each primitive of said set of primitives, each portion of said set of component portions being intersected, if at all, by no more than two Z planes of creating all component portions for said displayable object;
    mapping a texture onto a portion of said set of portions; and
    rendering said portion on a display device such that said set of portions display said object as a seamless complete object.

13. The process as claimed in claim 12 wherein said step of mapping a texture onto a portion of said set of portions further includes the step of interpolating points of said portion.

14. The process as claimed in claim 12 wherein said set of component portions of said primitive includes a polygon region having at least three associated vertices.

15. The process as claimed in claim 14 wherein said step of creating a set of component portions further includes the steps of:
    sorting said vertices of said polygon region based upon a Z coordinate of each said vertex; and
    determining if a Z coordinate of a Z plane of said array of Z planes is greater than said Z coordinate of each said vertex of said polygon region.

16. The process as claimed in claim 14 wherein said step of creating a set of component portions further includes the step of:
    generating a triangular region having three vertices, at least one of said three vertices corresponding to a point of intersection between a Z plane of said array of Z planes and said polygon primitive.

17. The process as claimed in claim 12 wherein said displayable object is decomposed into triangle primitives in said decomposing step.

18. The process as claimed in claim 12 wherein each Z plane of said array of Z planes is generated an equal distance from an adjacent Z plane in said generating an array step.

19. The process as claimed in claim 12 wherein each Z plane of said array of Z planes is generated an unequal distance from an adjacent Z plane in said generating an array step.

20. The process as claimed in claim 12 wherein said step of creating a set of component portions further includes the step of:
    generating a quadrilateral region having four vertices, at least one of said four vertices corresponding to a point of intersection between a first Z plane of said array of Z planes and said polygon primitive, at least one of said four vertices corresponding to a point of intersection between a second Z plane of said array of Z planes and said polygon primitive, said first Z plane and said second Z plane being adjacent to each other.

21. The process as claimed in claim 20 wherein said step of generating a quadrilateral region further includes the step of:
    decomposing said quadrilateral region into triangular regions, said triangular regions having three of said four vertices of said quadrilateral region.

22. The process as claimed in claim 12 wherein said step of mapping a texture includes a step of linearly interpolating texture parameters for each said portion created in said step of creating a set of component portions.

* * * * *